United States Patent [19]
Lefere et al.

[11] 4,172,473
[45] Oct. 30, 1979

[54] MOLDED HOSE INSERT

[75] Inventors: Robert M. Lefere; Guenter O. Kunz, both of Jackson, Mich.

[73] Assignee: Aeroquip Corporation, Jackson, Mich.

[21] Appl. No.: 879,370

[22] Filed: Feb. 21, 1978

[51] Int. Cl.² ............................................. F16L 11/08
[52] U.S. Cl. ..................................... 138/120; 138/121; 138/138; 138/155
[58] Field of Search ............... 138/138, 153, 174, 132, 138/173, 120, 121, 155

[56] References Cited
U.S. PATENT DOCUMENTS

| 2,822,857 | 2/1958 | Rothermel et al. | 138/138 |
| 3,109,461 | 11/1963 | Wolff et al. | 138/138 |
| 3,605,817 | 9/1971 | Bauman et al. | 138/121 |
| 3,831,890 | 8/1974 | Tolliver | 138/174 |

*Primary Examiner*—Lenard A. Footland
*Attorney, Agent, or Firm*—Beaman & Beaman

[57] ABSTRACT

The invention pertains to an insert for flexible wall hose used in vacuum applications, particularly hydraulic vacuum environments, consisting of a tubular body of nonmetallic elastomeric material adapted to be closely received within the bore of the hose, the insert body being supported against internal collapse by a plurality of metal rings embedded within the insert body material. The rings are axially spaced with respect to the body length whereby the insert body may be readily severed intermediate adjacent rings, and the end regions of the inserts are defined by the elastomeric body material. A plurality of insert bodies are inserted within the hose to be internally supported, and the insert body construction permits the inserts to be readily located within all lengths of hose complete support of the hose in hydraulic vacuum applications and produces minimal flow resistance and turbulence.

7 Claims, 3 Drawing Figures

U.S. Patent     Oct. 30, 1979     4,172,473
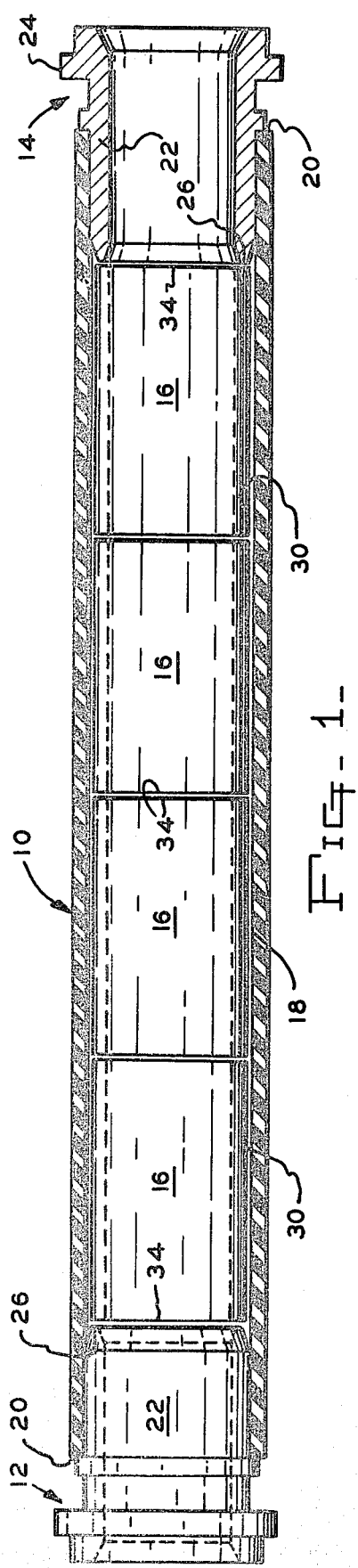
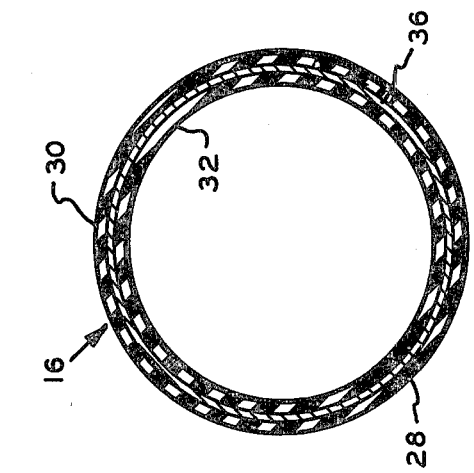
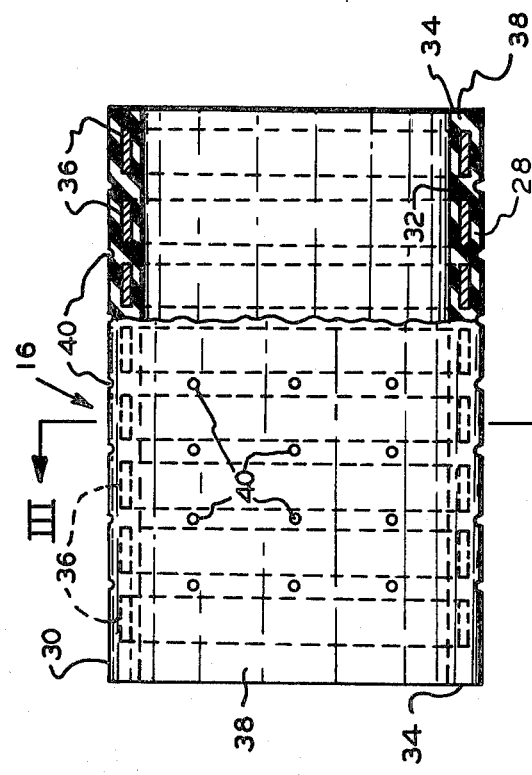

MOLDED HOSE INSERT

BACKGROUND OF THE INVENTION

Hose for conveying pressurized medium is usually reinforced with wire or fabric material against blow out and expansion. However, when such conventional hose is employed in vacuum applications the hose will tend to collapse as the reinforcing sheaths and covers do not effectively resist inwardly directed radial forces, and such hose collapse is particularly present in larger size-shoses such as those of three inch diameter and greater. Special purpose hydraulic hose has been developed for hydraulic vacuum applications such as used in pump suction lines and the like, and such vacuum hoses normally incorporate coiled metal components embedded within the hose material, or directly engaging the hose inner diameter, to prevent hose collapse. However, such suction hose is of a relatively specialized nature, expensive to manufacture and only available in a relatively limited number of sizes and materials.

Hydraulic hose capable of confining pressurized fluids is commercially available in a wide range of sizes and materials for handling various types of fluids, and it is known to use hose insert devices with such conventional hose in those applications wherein such hose is used to convey fluids at subatmospheric pressures. For instance, it has been the practice of the assignee to employ a stainless steel or beryllium copper spiral coil within its larger diameter flexible wall hose when used in hydraulic vacuum applications. However, such hose reinforcing coil is difficult to assemble within the hose as coil spacing members must be used in conjunction with the coil to maintain axial coil separation, and the presence of the coils within the hose produces adverse fluid flow characteristics and turbulence. Further, in submarine applications utilizing vacuum hose spiral inserts the presence of the metallic spiral produces undesirable noise as the end of the spiral wall engage the hose nipples, and in this particular application sound attenuation is of utmost importance.

BRIEF DESCRIPTION OF THE INVENTION

It is an object of the invention to provide a hose insert of molded construction which may be readily formed in a wide variety of sizes at economical cost wherein a plurality of inserts may be located within a flexible wall hose to be internally supported against collapse, the inserts permitting bending and deflection of the hose in a longitudinal direction and capable of being readily assembled with hose assemblies of any length.

A further object of the invention is to provide a molded hose insert for internally supporting flexible wall hose wherein the hose insert does not adversely interfere with fluid flow through the hose and all portions of the hose intermediate the fitting's nipples will be supported against internal collapse.

An additional object of the invention is to provide a molded hose insert of elastomeric material in which a plurality of metal rings are embedded, the rings being axially spaced with respect to each other supporting the insert against internal collapse, and the material of the insert being readily severable with a knife or similar common tool such that the insert length may be readily modified to accomodate the insert to the length of the hose assembly with which it is employed.

An additional object of the invention is to provide a molded hose insert which may be readily assembled into a hose assembly, has excellent sound attenuation characteristics, adequately supports the hose adjacent the fitting nipple and has good deflection capabilities.

A hose insert in accord with the invention constitutes a tubular body formed of synthetic rubber or similar nonmetallic elastomeric material, the body having inner and outer cylindrical surfaces and axially defined by end regions. A plurality of metal rings are molded within the wall of the insert body in axially spaced relationship, and the rings do not extend to the ends of the insert insuring the presence of elastomeric material between the rings nearest the insert ends and the actual end surfaces of the inserts as defined by the body material itself.

As it is usually necessary to modify the axial length of at least one insert, and often several, in order to fully support the hose length intermediate the hose assembly nipples the inserts are preferably provided with indicia on the external surface located intermediate the rings to indicate to the installer those locations at which the insert may best be radially severed. Such indicia may take the form of spots, grooves or lines molded into the insert outer surface.

When a hose assembly is to be used in a hydraulic vacuum application a plurality of inserts are placed within the hose such that inserts occupy the entire axial dimension of the hose intermediate the inner ends of the hose fitting nipples. An exact axial dimension of internal support as produced by the inserts can be achieved by shortening one or several of the inserts to produce the necessary overall insert assembly length, and after the hose inserts are located within the hose the completion of the hose assembly may be accomplished and the hose installed. In use, the inserts require no attention or maintenance and as axial movement of the inserts within the hose is prevented by the hose assembly fitting nipples it is not possible for the inserts to become misaligned or mislocated within the hose assembly.

BRIEF DESCRIPTION OF THE DRAWINGS

The aforementioned objects and advantages of the invention will be appreciated from the following description and accompanying drawings wherein:

FIG. 1 is an elevational sectional view of a hose assembly, utilizing the hose inserts of the invention, FIG. 2 is an elevational view, partially in section, of a molded hose insert in accord with the invention, and FIG. 3 is a sectional view of the insert as taken along Section III—III of FIG. 2.

DESCRIPTION OF THE PREFERRED EMBODIMENT

A hose assembly utilizing molded inserts in accord with the invention is shown in FIG. 1. Such an assembly includes a flexible walled hose 10 having fittings 12 and 14 telescoped within the hose ends, and the hose inserts 16, four being illustrated, are located within the hose intermediate the fittings.

The hose 10 utilizing the inserts of the invention will be of the flexible wall type usually constructed for the purpose of handling pressurized fluids, and normally employs reinforcing structure, such as a braided fabric sheath or cover which may be embedded into the elastomer hose material, or disposed over the hose outer surface. The hose includes an inner cylindrical surface 18, and the hose ends 20 are usually squared for engagement with an abutment flange defined upon the fittings.

Of course, if hose inserts are to be utilized with a hose the purpose of the hose is to confine fluids at subatmospheric pressures, usually, hydraulic vacuum applications, and the hose would normally be of at least three inch ID and may be of twelve inch ID or greater.

The fittings 12 and 14 may be of any conventional construction, and each include a nipple 22 received within the hose, and clamping structure, not shown, is usually imposed over the outer surface of the hose in radial opposition to the nipple in order to compress the hose end regions into a sealing engagement with the fitting nipple. The fittings include mounting flanges 24 whereby the fittings may be attached to other conduit structure, not shown, and the inner ends 26 of the nipples lie in planes perpendicular to the hose axis.

If hose support structure was not internally provided for the hose 10 the use of the hose in a vacuum application would cause the collapse of the hose intermediate the nipples 22, and for this reason the hose inserts 16 are located intermediate the fittings. The molded hose inserts in accord with the invention are best illustrated in FIGS. 2 and 3. The inserts consist of a tubular body 28 formed of an elastomeric material, such as synthetic rubber or the like, having a cylindrical outer surface 30 and a cylindrical inner surface 32. The axial ends of the inserts are defined by annular edges 34 lying in a plane perpendicularly related to the insert longitudinal axis. Preferably, the inserts 16 are formed by a molding operation wherein the reinforcing rings may be directly embedded within the insert body material.

The insert body is reinforced against collapse by a plurality of continuous periphery rings 36 formed of metal. The ring cross sectional configuration is of a rectangular flattened form as will be appreciated from FIG. 2, and the rings are preferably formed of a metal having high resistance to corrosion such as stainless steel or copper.

The radial thickness of the rings 36 is less than that of the radial wall thickness of the insert body 28 whereby the rings may be embedded within the body throughout the body circumference intermediate the outer surface 30 and the inner surface 32. Thus, the presence of the rings 36 is not externally apparent.

The rings 36 are axially spaced with respect to each other over the longitudinal length of the insert body 28, and the rings located adjacent the body ends are sufficiently spaced from the end edges 34 as to result in a significant portion 38 of elastomeric body material between the rings and the body ends.

As will be apparent from FIG. 2 indicia is defined upon the insert outer surface 30 to indicate the location at which the insert bodies may be severed by a knife or saw to modify the axial length thereof. In the disclosed embodiment the indicia comprise dimples 40 molded into the outer surface, and the dimples are axially located intermediate adjacent rings 36. If desired, such indicia could take the form of annular grooves or projecting ribs or lines defined on the outer surface 30, or lines could be painted or printed upon the inserts to indicate the location of the rings.

Normally, the distance separating the inner ends 26 of the nipples of the end fittings of a hose assembly utilizing the inserts of the invention will be significantly greater than the axial length of a single insert 16, and a plurality of inserts are necessary in order to extend between the nipple ends as will be appreciated from FIG. 1. As the overall length of a hose assembly is determined by the particular installation it is unlikely that a hose 10 will be fully adequately supported by utilizing inserts of original length, and in most installations it is important that the inserts occupy substantially all of the inner portion of the hose intermediate the nipple ends 26. Thus, in most instances, at least one, and perhaps several, of the inserts 16 will be severed to modify the insert length in order to permit the inserts to fully occupy the unsupported hose portion. If only an inch or so of additional insert is required the operator may choose to modify the length of several inserts in order to prevent using an insert of a very short axial length. Of course, the indicia 40, and the elastomeric nature of the insert bodies permit the inserts to be readily severed in a radial manner to modify the insert length.

Usually, the radial thickness of the insert bodies 28 will be no greater than, and often less, than the radial thickness of the fitting nipples 22, and the fact that the inserts 16 substantially abut against each other in an end-to-end relationship insures that the inserts will not form a restriction within the hose, or create significant fluid flow turbulence. Also, due to the fact that the rings 36 are embedded within the material of the insert body corrosion of the ring material is unlikely.

Preferably, the insert end portions 38 disposed immediately adjacent the nipple ends 26 will not have been severed so that significant resilient material exists between the nipple ends and the closest ring 36. This arrangement prevents metal-to-metal contact contact between the insert rings and the nipple producing excellent sound attenuation characteristics, which is particularly important in submarine applications, and the resilient "buffer" between the end of the nipple and the nearest ring will also produce long wearing characteristics.

The outer diameter of the inserts 16 is slightly less than the inner diameter of the hose 10 whereby the inserts may be readily inserted into the hose, but the inserts will prevent any significant collapse of the hose during operation. The use of the inserts in no way interferes with assembly of the hose components, and the flexible nature of the inserts permits their use in hose which is bent in installation. Preferably, the dimensions of the inserts in an axial direction are maintained of such length as to assure that the inserts will not cock or otherwise become disoriented with the hose bore, and once properly assembled, the relative relationships of the inserts to each and the hose assembly will not change.

It is appreciated that various modifications to the inventive concepts may be apparent to those skilled in the art without departing from the spirit and scope of the invention.

We claim:

1. A hose system comprising an outer flexible hose and an insert to support the hose wall against collapse comprising, in combination, a tubular body formed of a non-metallic severable elastomeric material having outer and inner surfaces, an axis, an axial length defined by ends, a plurality of rigid annular elements adhering to said body material each having an axis substantially parallel to said body axis and embedded within the material of said body intermediate said outer and inner surfaces, adjacent elements being separated from each other in the axial direction of said body, and indicia defined on said outer surface intermediate adjacent annular elements to indicate locations said tubular body may be radially severed.

2. An insert for a hose system as in claim 1 wherein said elements comprise metal rings having a continuous closed periphery.

3. An insert for a hose system as in claim 2, the rings disposed adjacent the ends of said tubular body being axially spaced inwardly of the adjacent end whereby said body ends are defined by the material of said body.

4. An insert for a hose system as in claim 1 wherein said indicia comprises indentations defined by the material of said tubular body.

5. A hose system comprising, in combination, a flexible hose and a plurality of tubular bodies of molded elastomeric material each having inner and outer surfaces and axially defined by ends located within the hose bore in end-to-end coaxial relationship, said bodies each being of an axial length substantially less than the axial length of the hose, and a plurality of rigid metal annular elements mounted upon each body in spaced axial relationship resisting radial inward deformation of said bodies, said bodies having an outer diameter slightly less than the diameter of the hose bore for axial slidable reception therein.

6. In an hose system as in claim 5 wherein said annular elements comprise rings having continuous closed peripheries having a radial thickness less than the radial thickness of said bodies as defined by said inner and outer surfaces, said embedded rings being within the material of said bodies coaxial to the associated body and intermediate said inner and outer surfaces.

7. In an hose system as in claim 6, indicia defined on said body outer surface intermediate said rings to indicate the locations said bodies may be severed to modify their length.

* * * * *